United States Patent
Cho

(10) Patent No.: US 7,945,288 B2
(45) Date of Patent: May 17, 2011

(54) PORTABLE ELECTRONIC APPARATUS HAVING A COOLING DEVICE

(75) Inventor: Kyung-il Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 534 days.

(21) Appl. No.: 11/369,729

(22) Filed: Mar. 8, 2006

(65) Prior Publication Data

US 2006/0215362 A1  Sep. 28, 2006

(30) Foreign Application Priority Data

Mar. 9, 2005 (KR) .................. 10-2005-0019405

(51) Int. Cl.
*H04M 1/00* (2006.01)
(52) U.S. Cl. .................. 455/556.2; 455/575.7; 455/101; 455/562.1; 455/341; 455/418; 455/552.2; 455/532.1; 455/757.6; 379/433.13; 379/433.05; 379/433.1
(58) Field of Classification Search ........... 343/700 MS, 343/790, 702, 906, 725, 718, 895; 455/575.7, 455/101, 532.1, 757.6, 341, 562.1, 117, 418; 379/433.13, 433.05, 433.1, 434; 361/683
See application file for complete search history.

(56) References Cited

U.S. PATENT DOCUMENTS

| | | | | |
|---|---|---|---|---|
| 5,734,716 A * | 3/1998 | Kulberg | ................ | 379/433.13 |
| 5,742,259 A * | 4/1998 | Annamaa | ................ | 343/895 |
| 5,844,985 A * | 12/1998 | Kulberg et al. | ................ | 379/433.13 |
| 5,907,817 A * | 5/1999 | Mendolia | ................ | 455/575.7 |
| 5,943,018 A * | 8/1999 | Miller | ................ | 343/702 |
| 5,977,928 A * | 11/1999 | Ying et al. | ................ | 343/790 |
| 6,097,934 A * | 8/2000 | Spall et al. | ................ | 455/575.7 |
| 6,191,742 B1 * | 2/2001 | Ha et al. | ................ | 343/702 |
| 6,215,446 B1 * | 4/2001 | Sullivan et al. | ................ | 343/702 |
| 6,252,555 B1 * | 6/2001 | Burton | ................ | 343/702 |
| 7,058,434 B2 * | 6/2006 | Wang et al. | ................ | 343/702 |
| 7,188,484 B2 * | 3/2007 | Kim | ................ | 62/259.2 |
| 7,623,893 B2 * | 11/2009 | Cupps et al. | ................ | 455/556.2 |
| 2001/0041545 A1 * | 11/2001 | Liberman et al. | ................ | 455/117 |
| 2002/0104319 A1 * | 8/2002 | Paine et al. | ................ | 62/4 |
| 2004/0121828 A1 * | 6/2004 | Wang et al. | ................ | 455/575.7 |
| 2004/0130625 A1 * | 7/2004 | Imamura et al. | ................ | 348/185 |
| 2004/0244397 A1 * | 12/2004 | Kim | ................ | 62/259.2 |
| 2005/0013104 A1 * | 1/2005 | Feague et al. | ................ | 361/683 |
| 2005/0062675 A1 * | 3/2005 | Chen | ................ | 343/906 |
| 2005/0134691 A1 * | 6/2005 | Cox | ................ | 348/207.99 |
| 2005/0280583 A1 * | 12/2005 | Chang | ................ | 343/702 |
| 2006/0063508 A1 * | 3/2006 | He et al. | ................ | 455/341 |
| 2006/0071859 A1 * | 4/2006 | Condon et al. | ................ | 343/700 MS |
| 2006/0227058 A1 * | 10/2006 | Zellweger et al. | ................ | 343/718 |
| 2007/0224947 A1 * | 9/2007 | Campbell et al. | ................ | 455/101 |

FOREIGN PATENT DOCUMENTS

KR  10-2005-007679 A  1/2005

* cited by examiner

*Primary Examiner* — Nick Corsaro
*Assistant Examiner* — Joseph Arevalo
(74) *Attorney, Agent, or Firm* — Sughrue Mion, PLLC

(57) ABSTRACT

A portable apparatus includes a main body having at least one electric part, a heat transmitter mounted to the main body for connection with the electric part, a connection member connected to the heat transmitter and having a first connection part accessible from outside of the portable apparatus and which emits a driving heat transmitted from the heat transmitter, and a detachable accessory device which is disposed in contact with the first connection part. Accordingly, a driving heat generated inside the main body of the portable apparatus can be emitted to the outside, passing through the heat transmitter and the connection member in sequence, thereby improving cooling efficiency of the portable apparatus.

16 Claims, 5 Drawing Sheets

PORTABLE ELECTRONIC APPARATUS HAVING A COOLING DEVICE

CROSS-REFERENCE TO RELATED APPLICATIONS

This application claims priority under 35 U.S.C. §119(a) of Korean Patent Application No. 2005-19405, filed Mar. 9, 2005, the entire contents of which are incorporated herein by reference.

BACKGROUND OF THE INVENTION

1. Field of the Invention

The present invention relates to a portable apparatus. More particularly, the present invention relates to a portable electronic apparatus comprising a cooling device for cooling a main body thereof during operation.

2. Description of the Related Art

Generally, a portable apparatus refers to an apparatus capable of processing wireless information and sound/image information during its portage, such as a mobile phone, a portable multimedia player (PMP), a digital camera, a personal digital assistant (PDA), and a laptop computer.

Recently, such portable apparatuses have been advanced to meet the users' various demands by being equipped with multi-functions. Accordingly, more and more high-efficiency electric parts are being mounted in the portable apparatus. The electric parts include an amplifier used for a synchronizer for signal reception, a sound/image processing element, and a main controlling element for main control of the portable apparatus. Such electric parts generate a driving heat while performing complicated jobs at high speed, thereby increasing an inner temperature of the portable apparatus. Such increase of the inner temperature may fatally damage some thermal-sensitive electric parts. Furthermore, as the tendency is toward miniaturation of the portable apparatus for handy portage, the above problem happens more frequently. Although various cooling methods have been introduced so far in order to overcome the above problem, they are not sufficient yet since the number of the high-efficiency electric parts mounted to the portable apparatus is increasing. Consequently, a more effective cooling device has been demanded.

SUMMARY OF THE INVENTION

An aspect of the present invention is to solve at least the above problems and/or disadvantages and to provide, for example, the advantages described below. Accordingly, an aspect of the present invention is to provide a portable apparatus equipped with an improved cooling device for effective cooling performance.

In order to achieve the above-described aspects of the present invention, there is provided a portable apparatus comprising a main body including therein at least one electric part; a heat transmitter connected to the electric part; and a connection member connected to the heat transmitter and having a first connection part accessible from outside of the portable apparatus and which emits a driving heat transmitted from the heat transmitter; and a detachable accessory device which is disposed in contact with the first connection part.

Through this, the driving heat inside the main body of the portable apparatus can be emitted, passing through the heat transmitter and the connection member, accordingly improving the cooling efficiency.

The accessory device comprises a second connection part detachably connected with the first connection part, and the first and the second connection parts are formed of a material capable of mutual thermal transmission.

According to this structure, since the driving heat can be emitted to the outside of the portable apparatus by sequentially passing through the heat transmitter and the accessory device, cooling efficiency can be further improved.

A part of the accessory device, the part which is exposed to the outside of the portable apparatus is formed of a material capable of emitting the driving heat through engagement of the first and the second connection parts, and the second connection part is connected to the exposed part of the accessory device for thermal transmission.

The first connection part has a plurality of projections. The plurality of projections are configured as a screw thread for screw-connection with the second connection part.

The accessory device includes an inner space for receiving a predetermined refrigerant so that cooling of the portable apparatus can be more effectively achieved.

The connection member is signal-communicably connected with a wireless signal transceiving unit mounted in the main body of the portable apparatus. The accessory device is implemented by an auxiliary antenna signal-communicably connected with the wireless signal transceiving unit through connection with the connection member.

The portable apparatus comprises a display panel capable of inputting a signal through a touch, the first connection part is formed as a hollow member, and the accessory device is implemented by a touch pen having a touch part for touching the display panel and inserted in the first connection part when not in use.

The portable apparatus may further comprise a plurality of projections formed on a part of the accessory device which is exposed when being connected to the main body.

In addition, the portable apparatus may further comprise a linking means linking the accessory device with the main body of the portable apparatus, so as to prevent loss of the accessory device even when the accessory device is not mounted to the portable apparatus.

The heat transmitter and the connection member are integrally formed with each other to simplify the structure of the portable apparatus.

BRIEF DESCRIPTION OF THE DRAWINGS

The above aspect and other features of the present invention will become more apparent by describing in detail exemplary embodiments thereof with reference to the accompanying drawings, wherein.

DETAILED DESCRIPTION OF THE EXEMPLARY EMBODIMENTS

Figure 1:
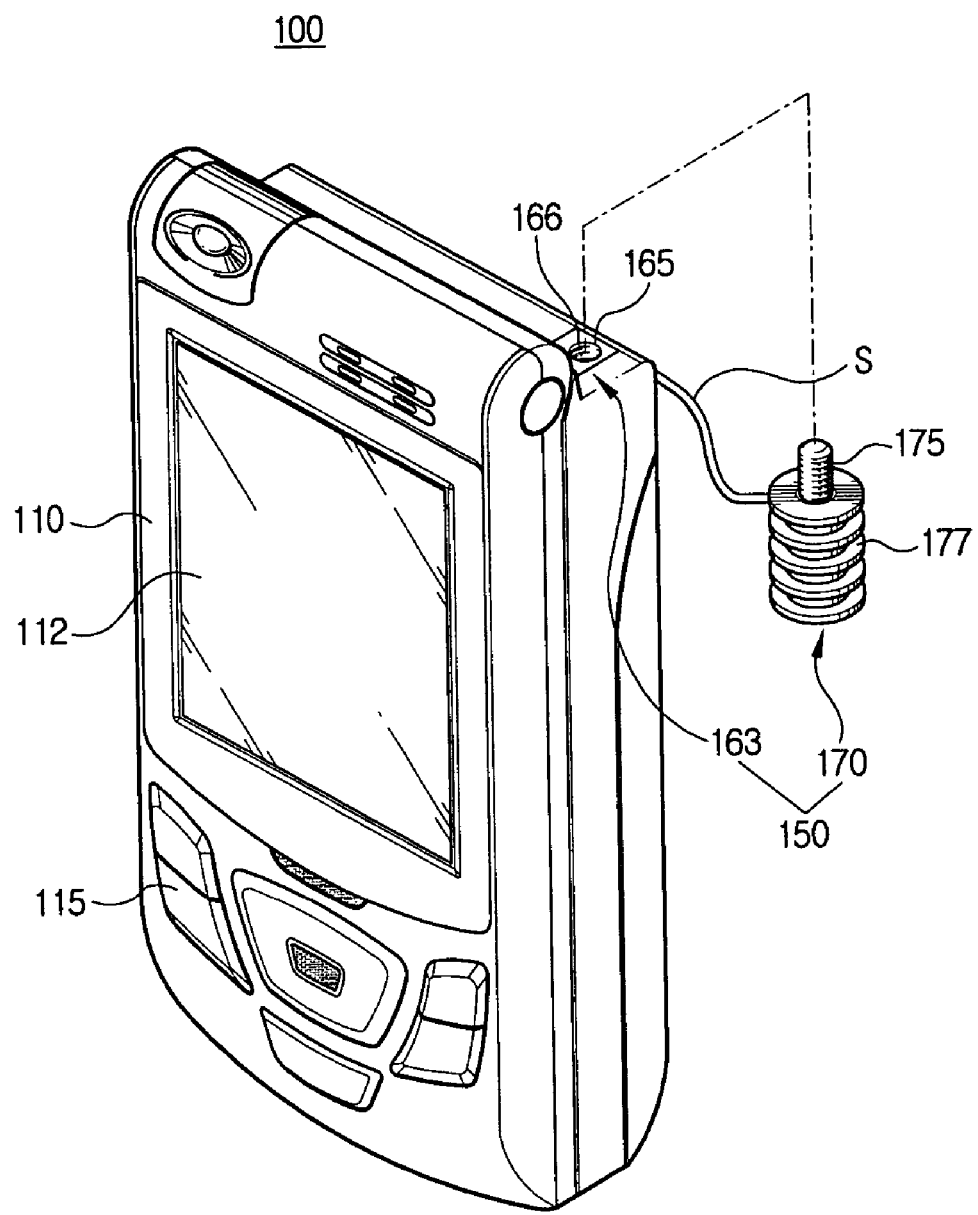
FIG. 1 is a perspective view of a portable apparatus according to a first embodiment of the present invention.

Hereinafter, certain exemplary embodiments of the present invention will be described in detail with reference to the accompanying drawing figures.

In the following description, the same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
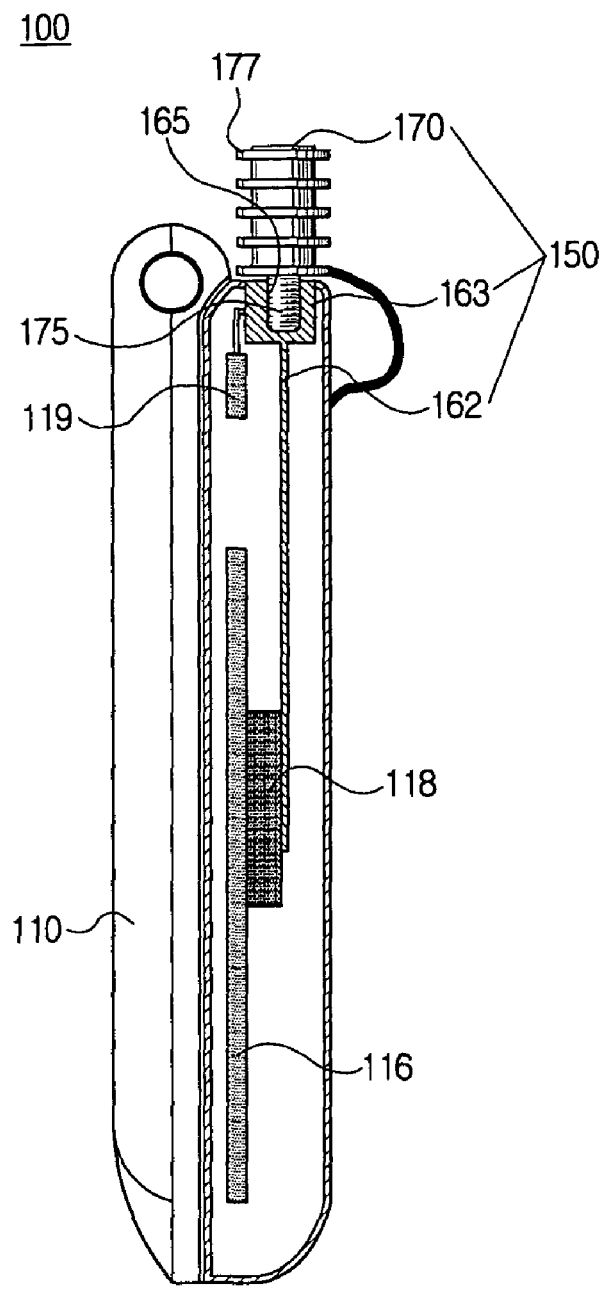
FIG. 2 is a view illustrating use of the portable apparatus according to the first embodiment of the present invention.

Referring to FIGS. 1 and 2, a portable apparatus 100 of this embodiment comprises a main body 110 and a cooling apparatus 150. The main body 110 comprises a plurality of operation keys 115 and a display panel 112 showing image information, and includes therein a plurality of electric parts. The electric parts may comprise a circuit board 116 and an electric element 118 mounted on the circuit board 116. Assuming that the portable apparatus 100 comprises a mobile phone, for example, the electric parts include a wireless signal transceiving unit 119 for transmission and reception of wireless signals.

The cooling device 150 is provided to cool the inside of the main body 110 during operation of the portable apparatus 100. For this purpose, the cooling device 150 in this embodiment comprises a heat transmitter 162, a connection member 163, and an accessory device 170.

The heat transmitter 162 is connected to one of the electric parts, which generates driving heat, at one side. By being connected to the electric element 118 mounted on the circuit board 116, the heat transmitter 162 transmits the driving heat from the electric element 118. In this regard, the heat transmitter 162 is made of metal having high thermal conductivity, such as copper or aluminum. Although not shown, the heat transmitter 162 may be formed by a heat pipe having therein a predetermined refrigerant for more efficient transmission of heat.

The connection member 163 is connected to the heat transmitter 162 at one side thereof which is received in the main body 110. The connection member 163 comprises a first connection part 165 formed at the other side thereof which is exposed to the outside of the portable apparatus 100. The first connection part 165 is connected to the accessory device 170 which will be described hereinafter and is formed as a hollow member according to the present embodiment. The above-structured connection member 163 is made of metal having high thermal conductivity, such as copper or aluminum so as to transmit the driving heat of the electric element 118 through the heat transmitter 162. In this case, the heat transmitter 162 and the connection member 163 may be formed integrally with each other to simplify the structure of the portable apparatus 100. According to the above structure, emission of the driving heat, for cooling of the portable apparatus 100, can be achieved through only the connection 163 and the heat transmitter 162. In order to enhance efficiency of heat transmission, the first connection part 165 of the present embodiment comprises a part having a non-smooth surface 166. The part 166 having a non-smooth surface increases contacting area between external air and the first connection part 165, thereby improving efficiency of heat transmission. As aforementioned, the portable apparatus 100 in this embodiment is structured as a mobile phone including the wireless signal transceiving unit 119 which is connected to the connection member 163 for signal communication. Therefore, the connection member 163 is able to function as an antenna transceiving the wireless signals.

Figure 3:
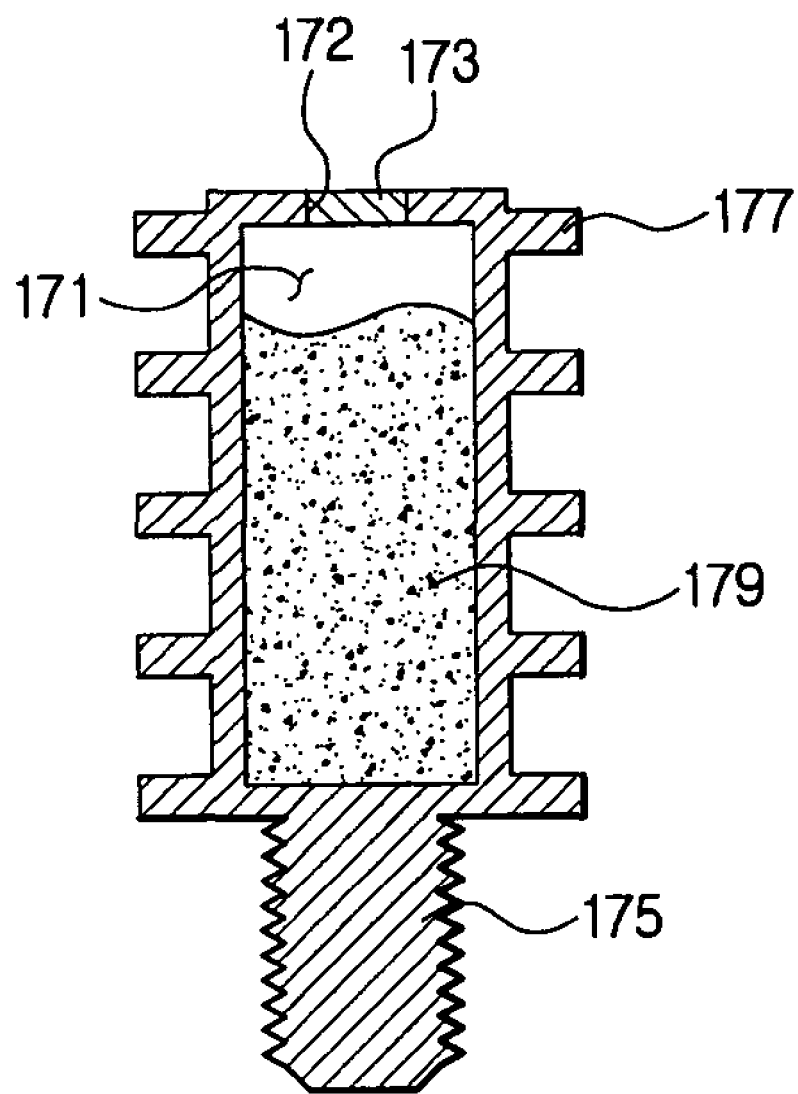
FIG. 3 is a longitudinal sectional view extractingly showing an accessory device of FIG. 2.

Usually, the accessory device 170 is detachably connected to the portable apparatus 100 simply to decorate the appearance of the portable apparatus 100 or provide additional functions to the portable apparatus 100. The accessory device 170 comprises a second connection part 175 to be mounted to the portable apparatus 100. The second connection part 175 is separably connected with the first connection part 165 of the connection member 163. The first and the second connection parts 165 and 175 are preferably fastened with each other using a screw thread. For this, the part 166 having a non-smooth surface of the first connection part 165 may be formed as an internal screw thread, while the second connection part 175 is formed as a screw-threaded portion corresponding to the part 166 of the first connection part 165. In addition, the accessory device 170 helps cooling of the portable apparatus 100 by transmitting the driving heat from the connection member 163 through engagement of the first and the second connection parts 165 and 175 and transmitting the driving heat to the outside of the portable apparatus 100. In order for more effective heat transmission, the accessory device 170 in the present embodiment is made of metal having high thermal conductivity, such as aluminum, and comprises a plurality of projections 177 protruded along an outer circumference thereof. Since the projections 177 increase contacting area between the external air and the accessory device 170, the driving heat can be more effectively emitted. As shown in FIG. 3, in addition, a predetermined refrigerant is charged in an inner space 171 of the accessory device 170 so as to enhance efficiency of heat emission. The refrigerant 179 is charged and discharged through a refrigerant port 172. The refrigerant port 172 is opened and sealed by a cap 173. Through connection with the connection member 163, the accessory device 170 in this embodiment is connected to the wireless signal transceiving unit 119, thereby serving as an auxiliary antenna. Such a function of the accessory device 170 is useful especially when the portable apparatus 100 receives signals of a variety of frequency bands. For example, when portable apparatus 100 is not adequately working, the accessory device 170 may help transception of the wireless signals of a predetermined frequency band, thereby improving performance of the portable apparatus 100. A link string S is an exemplary linking means that connects the accessory device 170 with the main body 110 of the portable apparatus 100, for convenient portage of the accessory device 170 even when the accessory device 170 is not in use.

Figure 4:
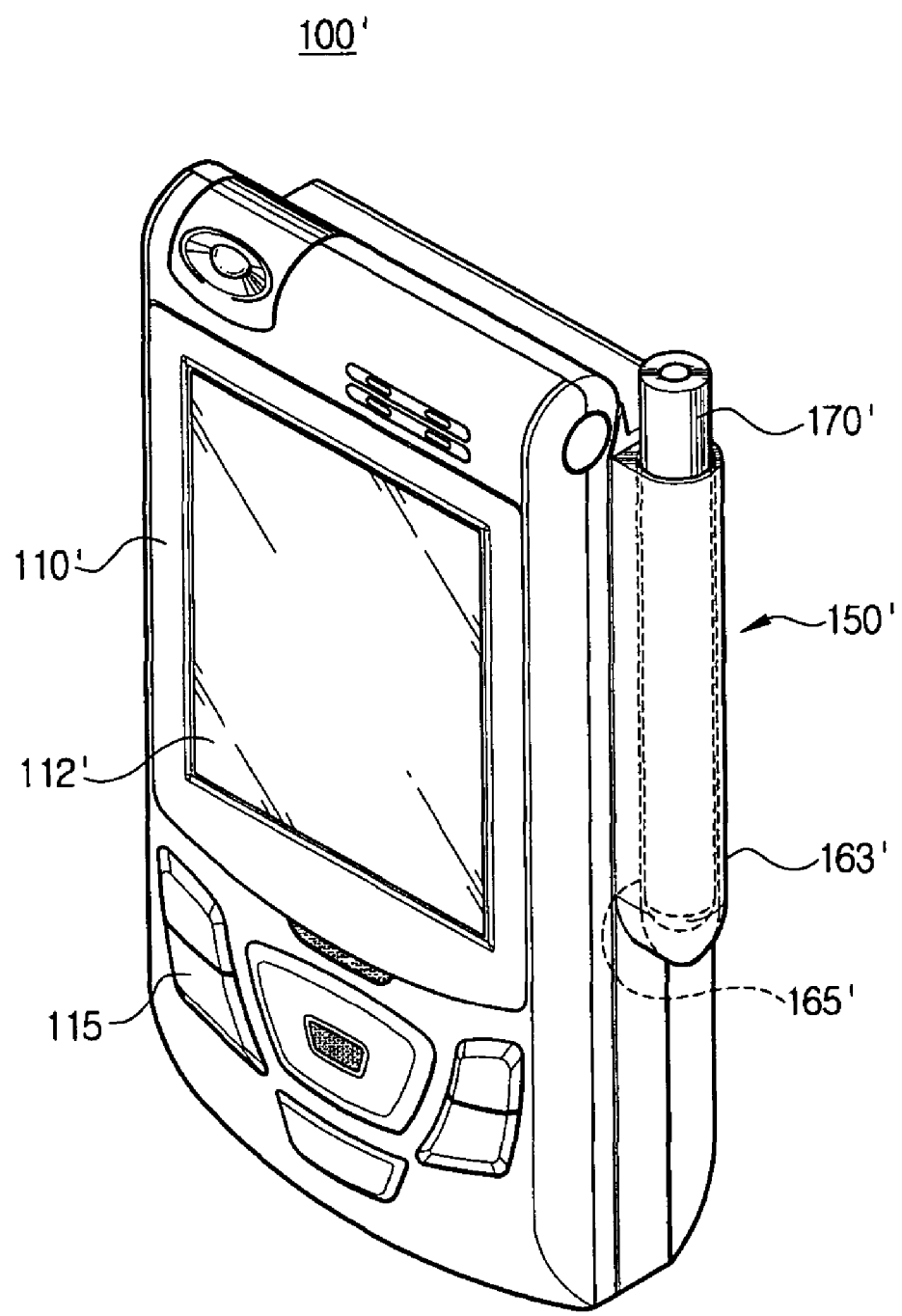
FIG. 4 is a perspective view of a portable apparatus according to a second embodiment of the present invention.
Figure 5:
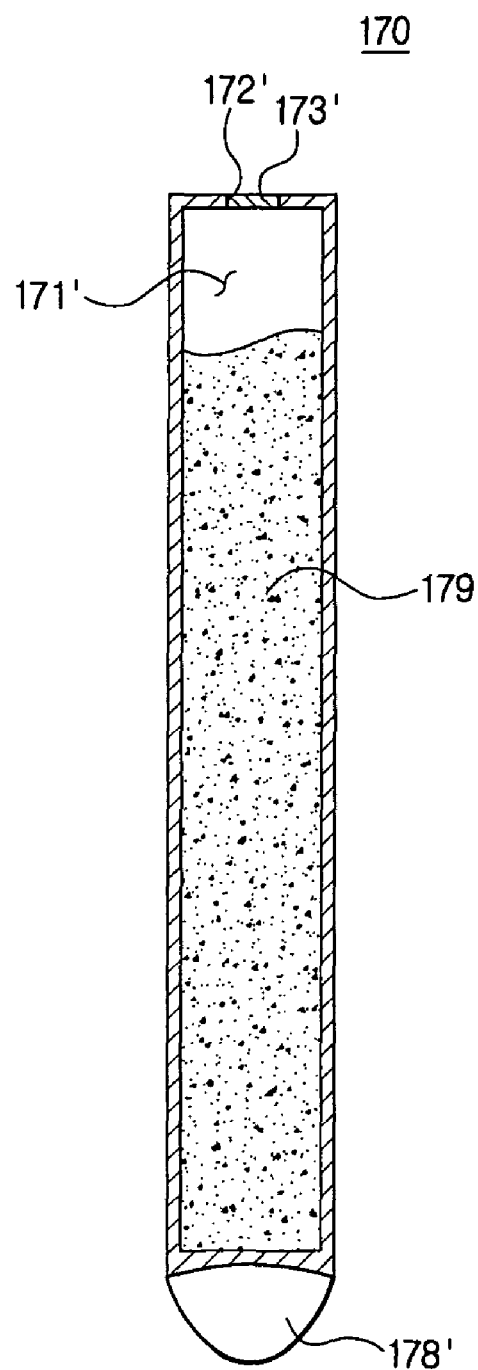
FIG. 5 is a longitudinal sectional view extractingly showing an accessory device of FIG. 4.

FIGS. 4 and 5 show a portable apparatus according to a second exemplary embodiment of the present invention. In a portable apparatus 100' of the present embodiment, a display panel 112' for displaying images is implemented by a touch screen. Accordingly, a cooling device 150' in this embodiment is structured as follows. An accessory device 170' is configured as a touch pen for a convenient contacting operation of the display panel 112'. Also, the accessory device 170' helps emission of the driving heat to the outside of the portable apparatus 100' by transmitting the driving heat from the connection member 163', as in the previous embodiment. For this purpose, the connection member 163' comprises a hollow member 165' for partial insertion of the accessory device 170'. Using the above structure, the hollow member 165' may serve as the first connection part 165 (FIG. 2) of the previous embodiment while the accessory device 170' being inserted in the hollow member 165' serves as the second connection part 175 (FIG. 2) of the previous embodiment. Although not shown, in the similar manner with the heat transmitter 162 (FIG. 2) of the previous embodiment, the connection member 163' is connected to a heat transmitter (not shown) mounted in the main body 110'. Except for an end portion 178' formed of flexible resin for performing a touching operation of the display panel 112', the accessory device 170' is preferably formed of metal having high thermal conductivity so as to enhance thermal transmission through contact with the hollow member 165'. In this case, the accessory device 170' may be charged with the predetermined refrigerant 179 in an inner space 171' thereof, thereby promoting the cooling performance. In addition, although not shown, the accessory device 170' may further comprise projections (not shown) at a part exposed to the outside of the portable apparatus 100', when being partly inserted in the hollow member 165', the projections (not shown) similar with the projections 177 (FIG. 2) of the previous embodiment, so as to increase the contacting area between the accessory device 170' and the external air. In the same manner as the previous embodiment, the connection member 163' is signal-communicably connected to the wireless signal transceiving unit 119 (FIG. 2). In this case, the accessory device 170' is also capable of serving as an auxiliary antenna as in the previous embodiment.

Although the mobile phone has been taken as an example and described so far, the present invention is not limited to this but may be applied to any other portable apparatuses that include an accessory device detachably mounted thereto, such as a portable multimedia player (PMP), a digital camera, a personal digital assistant (PDA), and a laptop computer.

According to the embodiments of the present invention as described above, cooling efficiency for portable apparatuses can be much improved using the connection member 163 (163') for mounting an accessory device for decoration of the portable apparatus or for additional functions. Thus, cooling of the portable apparatuses can be achieved through a simple structure.

In addition, since the accessory device 170 (170') also participates in transmission of the driving heat through connection with the connection member 163 (163'), the driving heat generated inside the portable apparatus 100 can be more easily emitted through the accessory device 170 (170'), thereby improving the cooling efficiency.

Furthermore, when the connection member 163 (163') is connected to the wireless signal transceiving unit 119 provided in the portable apparatus 100, performance of the portable apparatus 100 for wireless transception can also be enhanced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A portable apparatus comprising:
   a main body including therein at least one electric part;
   a heat transmitter fixedly and directly connected to the electric part to transmit heat generated/emitted by the electric part, wherein the heat transmitter is non-extendible and non-retractable;
   a connection member connected to the heat transmitter and having a first connection part, which is accessible from outside of the portable apparatus and which emits heat generated due to an increase in temperature caused by driving the electric part, the heat being transmitted from the heat transmitter; and
   a detachable accessory device which is disposed in contact with the first connection part,
   wherein the accessory device comprises a second connection part detachably connected with the first connection part, and the first and the second connection parts are formed of a material capable of mutual thermal transmission, and
   wherein the first connection part includes a plurality of projections each having a contacting area which contacts with an external air.

2. The portable apparatus of claim 1, wherein a part of the accessory device which is exposed to the outside of the portable apparatus is formed of a material capable of emitting the driving heat through engagement of the first and the second connection parts, and the second connection part is connected to the exposed part of the accessory device for thermal transmission.

3. The portable apparatus of claim 1, wherein the plurality of projections are configured as a screw thread for screw-connection with the second connection part.

4. The portable apparatus of claim 1, wherein the accessory device includes an inner space for receiving a predetermined refrigerant.

5. The portable apparatus of claim 1, wherein the connection member is signal-communicably connected with a wireless signal transceiving unit mounted in the main body of the portable apparatus.

6. The portable apparatus of claim 5, wherein the accessory device is implemented by an auxiliary antenna signal-communicably connected with the wireless signal transceiving unit through connection with the connection member.

7. The portable apparatus of claim 1, wherein the portable apparatus comprises a display panel capable of inputting a signal through a touch, the first connection part is formed as a hollow member, and the accessory device is implemented by a touch pen having a touch part for touching the display panel and stowed in the first connection part when not in use.

8. The portable apparatus of claim 1, further comprising a plurality of projections formed on a part of the accessory device which is exposed when being connected to the main body.

9. The portable apparatus of claim 1, further comprising a linking means for linking the accessory device with the main body of the portable apparatus, for convenient portage of the accessory device when the accessory device is not in use.

10. The portable apparatus of claim 1, wherein the heat transmitter and the connection member are integrally formed with each other.

11. The portable apparatus of claim 1, wherein the heat transmitter is disposed in a fixed matter internal to the main body.

12. The portable apparatus of claim 11, wherein the connection member includes a recess and a transceiver is mounted to the connection member.

13. The portable apparatus of claim 1, wherein the heat transmitter and the connection member are formed of a metal having a thermal conductivity.

14. The portable apparatus of claim 13, wherein the metal is copper.

15. The portable apparatus of claim 13, wherein the metal is aluminum.

16. A portable apparatus comprising:
   a main body including therein at least one electric part;
   a heat transmitter fixedly and directly connected to the electric part to transmit heat generated/emitted by the electric part, wherein the heat transmitter is non-extendible and non-retractable;
   a connection member connected to the heat transmitter and having a first connection part, which is accessible from outside of the portable apparatus and which emits heat generated due to an increase in temperature caused by driving the electric part, the heat being transmitted from the heat transmitter; and
   a detachable accessory device which is disposed in contact with the first connection part wherein the heat transmitter comprises a heat pipe having a refrigerant therein.

* * * * *